United States Patent
Fry

(10) Patent No.: US 12,536,188 B2
(45) Date of Patent: Jan. 27, 2026

(54) 3D GRAPHICAL APPROACH TO TECHNOLOGY ANALYSIS

(71) Applicant: The Government of the United States of America, as represented by the Secretary of Homeland Security, Washington, DC (US)

(72) Inventor: Mark Fry, Marco Island, FL (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/989,695

(22) Filed: Dec. 20, 2024

(65) Prior Publication Data

US 2025/0225137 A1      Jul. 10, 2025

Related U.S. Application Data

(60) Provisional application No. 63/617,939, filed on Jan. 5, 2024.

(51) Int. Cl.
| | |
|---|---|
| *G06F 16/248* | (2019.01) |
| *G06F 16/25* | (2019.01) |
| *G06T 11/20* | (2006.01) |

(52) U.S. Cl.
CPC .......... *G06F 16/248* (2019.01); *G06F 16/258* (2019.01); *G06T 11/206* (2013.01)

(58) Field of Classification Search
CPC ..... G06F 16/248; G06F 16/258; G06T 11/206
See application file for complete search history.

(56) References Cited

U.S. PATENT DOCUMENTS

| | | | |
|---|---|---|---|
| 6,750,864 B1 * | 6/2004 | Anwar | G06F 16/24556 345/440 |
| 10,042,636 B1 | 8/2018 | Srivastava et al. | |
| 10,417,812 B2 | 9/2019 | Djorgovski et al. | |
| 10,846,640 B2 | 11/2020 | Goel et al. | |

(Continued)

OTHER PUBLICATIONS

U. Erdemir, U. Tekin and F. Buzluca, "E-Quality: A graph based object oriented software quality visualization tool," 2011 6th International Workshop on Visualizing Software for Understanding and Analysis (VISSOFT), Williamsburg, VA, USA, 2011, pp. 1-8 (Year: 2011).*

(Continued)

*Primary Examiner* — Cheyne D Ly
(74) *Attorney, Agent, or Firm* — Kelly G. Hyndman; Robert W. Busby

(57) ABSTRACT

In an embodiment, a method of technology visualization requests, by an input module, input from a user specifying a technology that is to be visualized. A control module accesses a visualization database to retrieve values and other information pertaining to the technology. The input module requests input from the user specifying values or information not contained in the visualization database. The control module selects three dimensions to serve as three axes for a three dimensional visualization. The control module converts values from the visualization database or user input into a format for plotting in a coordinate system of the three axes. A visualization module generates a three dimensional visualization pertaining to the technology, criterion, and criterion information.

27 Claims, 6 Drawing Sheets

(56) References Cited

U.S. PATENT DOCUMENTS

| | | |
|---|---|---|
| 10,860,778 B2 | 12/2020 | Mendelson et al. |
| 11,580,118 B2* | 2/2023 | Imielinski ............... G06F 16/26 |
| 11,755,622 B1* | 9/2023 | Parsonnet ............. G06F 16/283 |
| | | 707/737 |
| 2017/0123627 A1 | 5/2017 | Cristoforo |
| 2017/0249574 A1 | 8/2017 | Knijnik et al. |
| 2021/0133670 A1 | 5/2021 | Cella et al. |
| 2025/0053568 A1* | 2/2025 | Slimi .................... G06F 16/211 |

OTHER PUBLICATIONS

H. Gall, M. Jazayeri and C. Riva, "Visualizing software release histories: the use of color and third dimension," Proceedings IEEE International Conference on Software Maintenance—1999 (ICSM'99). 'Software Maintenance for Business Change' (Cat. No .99CB36360), Oxford, UK, 1999, pp. 99-108 (Year: 1999).*

L. Zhang et al., "Visual analytics for the big data era—A comparative review of state-of-the-art commercial systems," 2012 IEEE Conference on Visual Analytics Science and Technology (VAST), Seattle, WA, USA, 2012, pp. 173-182 (Year: 2012).*

Kim, JM., Kim, NK., Jung, Y. et al. Patent data analysis using functional count data model. Soft Comput 23, 8815-8826 (2019) (Year: 2019).*

Pat Pataranutaporn et al., "AI-generated characters for supporting personalized learning and well-being", Nature Machine Intelligence, vol. 3, Dec. 2021, pp. 1013-1022.

Mark P. Mills, "Electric Vehicles for Everyone? The Impossible Dream", Jul. 2023, Manhattan Institute.

* cited by examiner

3D GRAPHICAL APPROACH TO TECHNOLOGY ANALYSIS

CROSS-REFERENCE TO RELATED APPLICATIONS

This nonprovisional application claims the benefit of priority from U.S. Provisional Application No. 63/617,939 entitled "3D Graphical Approach to Technology Analysis," filed on Jan. 5, 2024, the content of which is incorporated herein by reference in its entirety.

STATEMENT OF GOVERNMENT INTEREST

The present invention was made by employees of the United States Department of Homeland Security in the performance of their official duties. The Government has certain rights in the invention.

FIELD

The present subject matter relates generally to the field of analysis, and more specifically to the field of graphical visualization.

BACKGROUND

The success of a technology lies in the hands of the users. Customer preferences, including cultural preferences, of each new generation that enters the job markets and starts making decisions about what to buy, can affect technology. Humans buy or rent the technology, and if in large enough numbers, this activity entices capital dollars that will be used to design, fabricate, and distribute the technology, plus make possible the continued use of the technology through maintenance technologies.

One example is the idea of self service in the marketplace. Piggly Wiggly introduced self-service grocery stores in 1916. Prior to that, customers relied upon clerks to search shelves and produce the items requested. The Piggy Wiggly idea was patented and began in Memphis and later evolved into franchising. But the consumer public was slow to accept the concept. One sub technology that needed to be adopted was the simple shopping cart. No one had made these before. Merchants had to facilitate the ability of customers to load and move items from shelves to checkout. Another technology that had to be developed was the cash register. Previously, the clerks that brought the goods from shelves to counter, listed and added up the prices.

NCR cash registers began a predominant company in 1884 to further fulfill the need to speed up shopping times. First patented in 1879, the mechanical cash register changed point of sales processing. The electric motor was added in 1906, greatly speeding the checkout process.

Bar codes were invented in the late 1940s. It wasn't until the 1970s when IBM linked bar code readers with computers. The important sub-technology was the computer. And it wasn't until the 1990s that scanners began to make their way into the supermarkets. Why so long to transition? Costs of computers were an issue, but also an issue was the size of the computer at the checkout lane. Further time (decades?) was required for customers to feel comfortable doing their own scanning and checkout. Customers were not asking for these innovations; the entrepreneurs wanted to increase throughput and reduce labor costs.

SUMMARY

In an embodiment, a method of technology visualization requests, by an input module, input from a user specifying a technology that is to be visualized. A control module accesses a visualization database to retrieve a technology value pertaining to the technology, a criterion corresponding to the technology, a criterion value pertaining to the criterion, a criterion information corresponding to the criterion, or a criterion information value pertaining to the criterion information. The input module requests input from the user specifying one or more of the technology, technology value, criterion, criterion value, criterion information, or criterion information value not contained in the visualization database. The control module selects three dimensions of information relevant to the technology available from the visualization database or user input. The three dimensions of information to serve as three axes for a three dimensional visualization. The control module converts values from the visualization database or user input into a format for plotting in a coordinate system of the three axes. A visualization module plots the technology, criterion, or criterion information, based on the values along the three axes to generate a three dimensional visualization pertaining to the technology, criterion, and criterion information.

In another embodiment, a system to visualize a technology comprises a computer system, including a processing system having a hardware processor configured to perform a predefined set of basic operations by loading corresponding ones of a predefined native instruction set of codes, the predefined native instruction set of codes constituting a set of instructions selectable for execution by the hardware processor. The computer system includes a memory accessible to the processing system, and a user interface controller under control of the processing system. User interface logic, stored in the memory, includes a sequence of instructions selected from the predefined native instruction set of codes of the hardware processor, adapted to operate with the processing system and the user interface controller to implement a user interface adapted to prompt for user input and receive the user input. A communication system, under control of the processing system, is adapted to transmit and receive user input, values, axes, and information pertaining to the technology for a three dimensional visualization. Input logic, stored in the memory, includes a respective sequence of instructions selected from the predefined native instruction set of codes of the hardware processor, adapted to request input from a user specifying a technology that is to be visualized. Control logic, stored in the memory, includes a respective sequence of instructions selected from the predefined native instruction set of codes of the hardware processor, adapted to access a visualization database to retrieve a technology value pertaining to the technology, a criterion corresponding to the technology, a criterion value pertaining to the criterion, a criterion information corresponding to the criterion, or a criterion information value pertaining to the criterion information. The input logic requests input from the user specifying one or more of the technology, technology value, criterion, criterion value, criterion information, or criterion information value not contained in the visualization database. The control logic selects three dimensions of information relevant to the technology available from the visualization database or user input. The three dimensions of information serve as three axes for a three dimensional visualization. The control logic converts values from the visualization database or user input into a format for plotting in a coordinate system of the three axes. Visualization logic is stored in the memory and includes a respective sequence of instructions selected from the predefined native instruction set of codes of the hardware processor, adapted to plot the technology, criterion, or criterion information, based on the values along the three axes to generate a three dimensional visualization pertaining to the technology, criterion, and criterion information. The processing system outputs the three dimensional visualization.

In yet another embodiment, a tangible non-transitory computer-readable medium having stored thereon computer-executable instructions that, if executed by a computing device, cause the computing device to request, by an input module, input from a user specifying a technology that is to be visualized. A control module accesses a visualization database to retrieve at least one of: a technology value pertaining to the technology, a criterion corresponding to the technology, a criterion value pertaining to the criterion, a criterion information corresponding to the criterion, and a criterion information value pertaining to the criterion information. The input module requests input from the user specifying one or more of the technology, technology value, criterion, criterion value, criterion information, or criterion information value not contained in the visualization database. The control module selects three dimensions of information relevant to the technology available from the visualization database or user input. The three dimensions of information serve as three axes for a three dimensional visualization. The control module converts values from the visualization database or user input into a format for plotting in a coordinate system of the three axes. A visualization module plots the technology, criterion, or criterion information, based on the values along the three axes to generate a three dimensional visualization pertaining to the technology, criterion, and criterion information.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

DETAILED DESCRIPTION

Figure 1:
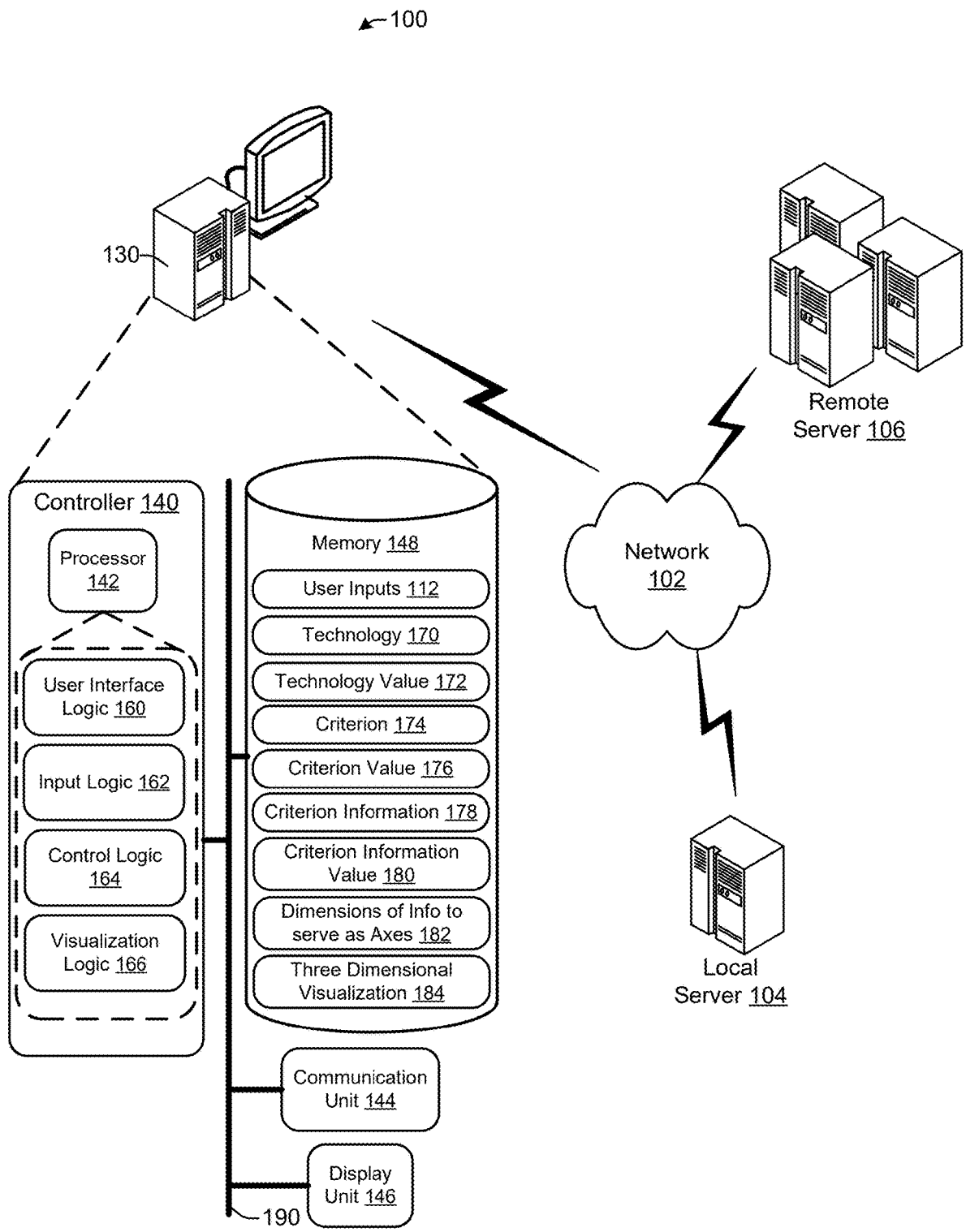
FIG. 1 illustrates a system to visualize technology according to an embodiment.

Embodiments allow scientifically backed predictions of the evolutionary path of a technology. The future success of technologies and how they will evolve is prediction. The prediction can be opinion, or it can have scientific basis that is forged through examination of historical development of similar technologies. Approaches can integrate the scientific and engineering challenges and subsequent successes of multiple technologies that can serve as feedstock for embodiments. Embodiments can use case studies of the evolution of technologies (both similar, subsets or even different) to predict the future, and to do that in a creative way, much like generative artificial intelligence (AI). Embodiments place those case studies into database format, choose a framework and neural network to produce algorithms which can be used in the equations of probability for time to develop. The equations of probability are models derived from the study of the case studies using the generative AI approach.

Out of the above discussion come some rules governing evolution of technology: 1. A new idea that is novel begins the process. The technology can be old but needs a different approach. 2. The idea saves time and money for the end user. 3. General infrastructure is available or can be built. Infrastructure is defined as using someone else's support (highways, data networks, electricity, water supply, etc.). 4. Sub-technologies that support the idea are available or can be developed on their own. a. Important feedstocks must exist or be created (supply chain, IT systems, raw materials, IP systems [AI/ML]). 5. Cultural changes may be necessary for customers to adopt and use the technology. 6. Assess existing or proposed Government mandates for using the technology.

For each of the factors above, embodiments can assign a time number and a money estimate. Rule 3 can be daunting: cell phones needed a national/global tower infrastructure with antennas and wired systems linking them together. Over twenty years passed before smart phones could have the pathways they needed to function properly. Rule 4 is important because it can greatly influence the factors (example, lithium is abundantly available for a new type of battery). Rule 6 increases in importance as time passes. In the electric car debate, the cry about CO2 has driven the market. It is unknown how much, if at all, CO2 emissions will decline as electric vehicle use rises. Also, "Rarely has a government, at least the U.S. government, banned specific products or behaviors that are so widely used or undertaken. Indeed, there have been only two comparably far-reaching bans in U.S. history: the Eighteenth Amendment to the U.S. Constitution, which prohibited the consumption of alcohol (repealed by the Twenty-First Amendment); and the 1974 law prohibiting driving faster than 55 mph. Neither achieved its goals; both were widely flouted, and the first one engendered unintended consequences, not least of which was criminal behavior." From a report by Mills, "Electric Vehicles for Everyone? The Impossible Dream" by Mark P. Mills (Electric Vehicles for Everyone? The Impossible Dream|Manhattan Institute) https://manhattan.institute/article/electric-vehicles-for-everyone-the-impossible-dream.

The rules, or some collection of rules/guidance similar to them, form the basis of the first chart that would be in the 3-D graphical output presentation. Sublayers addressing their individual rules would be provided in subsequent charts. These are the foundational layers that help to build a usable framework and together with the data from the case studies will lead to a final (draft) chart that depicts the New idea.

FIG. 1 illustrates a system 100 to visualize technology according to an embodiment. The system 100 includes a computer system 130, in communication via network 102 with local server 104 and remote server 106. The computer system 130 includes controller 140 coupled via a bus 190 to memory 148, communication unit 144, and display unit 146. The controller 140 includes a processor 142 to execute user interface logic 160, input logic 162, control logic 164, and visualization logic 166.

The memory 148 is associated with user inputs 112, technology 170, technology value 172, criterion 174, criterion value 176, criterion information 178, criterion information value 180, dimensions of information to serve as axes 182, and three dimensional visualization 184.

The computer system 130 includes one or more communicatively coupled communication units 144, processors 142, and memory 148. The communication unit 144 is representative of one or more devices able to communicate information to or from other devices and components including in instances those included in or external to the system 100. Example communication units 144 include but are not limited to wireless modems (such as an 802.11 compliant unit), wired (e.g., Ethernet-ready) or other such communication interfaces, or a cellular communication transceiver. Example 802.11 compliant modems or cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York.

Although a single processor 142 and memory 148 are shown, the computer system 130 can be constructed with multiple processors and memory. The processor 142 is representative of hardware that is capable of processing computer executable instructions, such as a central processing unit that executes a program of instructions. In embodiments, the processing unit (processor 142) implements an operating system which is a set of instructions that allows the processor to perform specialized instructions according to a program run on the operating system or processor platform.

Local memory 148 is representative of a wide variety and types and combinations of memory suitable for storing information in an electronic format. Example memory includes but is not limited to random access memory (RAM), hard disk memory, removable medium memory, flash storage memory, and other types of computer-readable media including non-transitory data storage.

In embodiments, the controller 140 is representative of hardware or software that is constructed to function as described in this disclosure. For example, the controller 140 is a combination of software (such as a program of instructions that is stored in local memory) that is useable by the processor 142 to provide the described capabilities and functions, such as when the embodied instructions are executed by the processor 142 included in the computer system 130. As illustrated and for ease of understanding, the controller 140 includes the processor 142 and the various illustrated generators and modelers, and other logic or features described herein. While shown and described as individual modules, the supporting hardware or software can be configured as an integrated program of instructions to provide the described functionality, such as through the use of application program interfaces (APIs) that permit individual programs to interface to one or more other programs and provide one or more graphical user interfaces (GUIs) output on a display unit 146 to a user to access information or exercise control over the computer system 130 including a visual display output.

The computer system 130 executes the various modules associated with processor 142. The user interface logic 160 and input logic 162 make use of the user inputs 112. The control logic 164 makes use of the technology 170, technology value 172, criterion 174, criterion value 176, criterion information 178, criterion information value 180, and dimensions of information to serve as axes 182. The visualization logic 166 generates the three dimensional visualization 184.

To generate the three dimensional visualization 184 or other models or generated results, the computer system 130 can draw source data from databases, whether stored on computer system 130, or retrieved over network 102 from local server 104 or remote server 106.

A system uses a 3D graphical approach to visualize technologies. The system requests inputs from a user regarding a technology to visualize, including criteria and criteria information associated with the technology. The system accesses a database to search for criteria and criteria information for the specified technology. If criteria or criteria information is available for the technology, the system retrieves the criteria or criteria information from the database for visualizing the technology. The system also requests criteria and criteria information for the technology from the user, e.g., if not available from the database, or if the user wants the system to use criteria or criteria information that complements, or differs from, the retrieved criteria or criteria information from the database. The system converts the criteria information into a format compatible with plotting, and uses the criteria information to plot the criteria information, criteria, and technology on the 3D visualization.

In an embodiment, the criteria can include supply chains, material required, sub technologies or subsystems, cyber risk or cyber vulnerability, funding, maturity, Impact of technology, Technical feasibility Potential market demand, Technology development, Vulnerabilities, Convergence potential, speed, advanced materials, convergence, cyber vulnerability, supply chain vulnerability.

A given criterion for the technology includes criterion information having values or scores (hereafter values) in one or more dimensions. The criteria information can include a descriptive name. A criterion can include criterion information having a range of descriptive names, corresponding to a range of values. The values can include one or more dimensions. The criterion information that lacks values for a given dimension that is being plotted can inherit values for the missing dimensions from the technology or other criteria or criterion information for the technology to which the criterion information is assigned (directly or indirectly via criteria).

For example, the system prepares 3D visualization for a technology called Widget. The system chooses example axes for the 3D visualization of Time, Maturity, and Cost. The system has a speed criterion for the technology Widget. The speed criterion includes a criterion value for the "Time" axis, but lacks values for the Maturity axis and the Cost axis. The system then assigns the speed criterion (the speed criterion "inherits") interpolated criterion values for the maturity value and cost value. The system can perform calculations to determine the interpolated criterion values, using values from the technology, other criteria, or other criterion information.

For example, the system uses criterion information available from criteria of the technology, and determines average values from among the available criterion information. The average values can serve as coordinates, which the system assigns to the technology. The system can use various approaches for averaging the available criterion information, including weighted averaging based on type of criteria and the like. The system can then assign one or more of the average criterion information values to criteria information that lacks one or more dimensions corresponding to the given 3D visualization. For example, the "speed" criterion mentioned above is to be plotted onto 3D visualization axes of time, maturity, and cost. However, the speed criterion lacks values for the maturity or cost dimensions. Accordingly, the system recognizes this and causes the speed criterion to inherit the averaged maturity value and averaged cost value from the Widget technology. Visually, the speed criterion is displayed at the same coordinates as would be the widget technology (in embodiments where the technology itself is plotted), but offset along the time axis corresponding to the effect of the values contained in the speed criterion associated with time.

A given criterion can include criteria information that is a function, such as a function expressed in terms of one or more axis dimensions. For example, the criterion "speed" can be expressed as a value that changes with respect to the axis dimension time. The criteria information also can be expressed as a function in terms of another criteria information, another criteria, or another technology.

For example, the system can use the time criterion for a technology, as input for the speed criterion expressed as the function s=1/t, to calculate the corresponding coordinate on the speed axis by using the axis dimension of time. For example, if the time coordinate is 2, the speed coordinate is S=1/t=1/2.

In an embodiment, descriptive names for the criteria information can include the following. The criterion speed can include criterion information described as: Arrived—Ubiquitous; Arrived—Limited Use; 1-2 years away; 3-5 years away; and More than 5 years away. The criterion Advanced Materials can include criterion information described as: Requires advanced materials for mass production that have not been developed or for which no manufacturing capacity exists; Requires advanced materials for mass production that can be produced on a limited basis at a significant cost; Requires advanced materials for mass production that are being produced on a large industrial scale; and Does not require advanced materials for mass production. The criterion Convergence can include criterion information described as: Requires another foundational technology to function; May be paired with one or more foundational technologies but is capable of functioning without; and Foundational technology. The criterion Cyber Vulnerability can include criterion information described as: Requires significant connection to the Internet or other networked devices to perform its core functions; Has connections to the Internet or other networked devices but the connection is not required to perform core functions; Connects to the Internet or other networked devices for maintenance or software upgrades only; and Does not connect to the Internet or other networked devices. The criterion Supply Chain Vulnerability can include criterion information described as: Has a complex and multi-national supply chain that includes countries possibly hostile toward US interests; Has a complex and multi-national supply chain that does not include countries possibly hostile toward US interests; Has a limited multi-national supply chain that depends upon supply from countries possibly hostile toward US interests; Has a limited multi-national supply chain that depends upon supply from countries not likely to be hostile toward US interests; Has a complex domestic supply chain; and Has a limited domestic supply chain.

For such descriptive names of criteria information, the system can assign scores or values that correspond to the descriptive names. The system can use the scores or values to plot the criteria relative to the axes of the 3D visualization. For example, the descriptive names for the criterion speed can be assigned offset values as follows: Arrived—Ubiquitous=0; Arrived—Limited Use=+1; 1-2 years away=+2; 3-5 years away=+3; and More than 5 years away=+4. For such offsets, the system adds or subtracts the offsets to relevant dimensions of an existing set of coordinates. Thus, if an existing set of coordinates for a criteria includes a time coordinate of 5, the system would increase the time coordinate of that criteria to 8 if the criteria were assigned a criterion information of 3-5 years away (corresponding to an offset of +3, incrementing the initial value of 5 to 8). In another embodiment, the system can convert these values to absolute coordinates for plotting on a time dimension where these points lie. For example, the system can normalize the value scale, 0 . . . +4 to cover the displayed range of the axis of the 3D visualization, to compensate for the displayed absolute range of the values' axis in the 3D visualization, e.g., normalize values 0 . . . +4 to coordinate axis range of x=0 . . . +10 where the axis is displayed from 0 to 10. The system can also use these values as relative offset adjusters, to adjust a position of the coordinates of another element to be plotted, such as plotting the criterion itself, or the technology or technologies that include this criterion and value. For example, for a criteria information value of +2, the system can adjust the position of the criteria or technology incrementally by an absolute value of 2 or by a scaled value (adjusted according to the ratio of the value ranges to the axis ranges). Thus, the system can determine the scaled ratio between the range of criteria values (0 . . . 4=range of 5) and the range of the corresponding axis of the 3D visualization (0 . . . 0=range of 10 for the axis which is double the range of criteria values) and determine that the offset of +2 from the criteria values should be doubled to correspond to the offset that the target coordinates should be moved along the axis in the 3D visualization.

The system can ask the user to choose the three dimensions to assign to the axes of the 3D visualization, and then plot the technology, criteria, or criteria information on the 3D visualization axes. The system can automatically select three dimensions based on the information available for the technology, criteria, or criteria information. For example, the system can determine that three types of criteria information are available for the provided criteria and technologies, and therefore use those three types of criteria information as the axes for the 3D visualization. The system can determine that more than three types of criteria information are available, and use the three types of criteria information that are most commonly found or most repeated among the criteria or technologies, and use those three as the axes of the 3D visualization. In an example, the axes are maturity, time, and geography. The criteria information may include specifics such as address, and the system can generalize the address information to determine geography to a desired level of generality (e.g., generalize address to neighborhood, town, city, state, country, continent, etc.).

In an embodiment, the system can combine multiple dimensions of criteria information to generate a combined score, and assign the combined score to a combined axis of the 3D visualization. For example, the system can use values from a maturity criterion and values from a speed criterion, to generate combined values that the system plots on a time axis. The system can combine the values in various techniques, such as by summing, averaging, using functions or equations, and so on. For example, the maturity criterion can be expressed as a function of time, and the speed criterion can be expressed as a function of time. The system can determine the combined score for time by summing the functions for maturity and speed.

The system generates a 3D visualization using a three-axis coordinate system corresponding to three dimensions of the criteria information for the criteria of the technology.

The system or user can select which of the three dimensions to serve as axes for plotting the criteria information, criteria, or technology on a 3D plot.

The system can plot the criteria information for criteria. The system can plot criteria for the technology. The system can plot the technology. In an embodiment, the system represents the criteria and technologies using bubbles. The system can plot criterion information or a criterion at coordinates corresponding to the values for that criterion information or for that criterion.

The system can determine an average score among the criterion information or criterion that contribute to their respective criterion or technology, for each dimension of the 3D visualization. The system can assign the average score to coordinates for the criterion or technology corresponding to the criterion information. The system plots the technology and criteria on axes corresponding to the at least three dimensions, based on the average score. The system displays the technology with visible connectors to its associated criteria or criteria information.

In an embodiment, the system labels the 3D visualization using the technology as a title. The system plots the criteria and criteria information for the labeled technology in the 3D visualization, including links between the criteria or criteria information as appropriate, without plotting the technology on the 3D visualization. In another embodiment, the system plots the technology in the 3D visualization, using coordinates that are an average of the criteria coordinates for the technology.

The system uses the visible connectors to illustrate links between technology bubbles, criteria bubbles, or criteria information bubbles. The visible connectors can be straight lines or dotted lines, according to a strength value or type of the relationship between the bubbles connected by the visible connector. Criteria values for criteria can include functions, e.g., as a function of time or other variable related to the criteria or criteria values, corresponding to how one or more other criteria changes over time. The system can use a visible connector to represent the functional relationship between the connected bubbles. A criterion can include a link between two technologies, criteria, or criteria information, enabling the system to link the technologies, criteria, or criteria information together. The system can compare technologies, criteria, or criteria information to determine whether to illustrate a link between technologies, criteria, or criteria information. For example, where the system determines two criteria share multiple criteria information categories beyond a threshold number, the system can visualize a link between the criteria. The user can also specify links for the system to visualize between technologies, criteria, or criteria information. The linking criteria can include a relationship expressing how the criteria of the linked technologies is to be modified by the link, e.g., to create a new average score for the linked technologies as a group. Another kind of link can indicate a dependency relationship without affecting the scores, to indicate a one-way or two-way dependency between the technologies, criteria, or criteria information. A link can also include a one-way modifier to add or multiply the scores of the parent bubble and apply those to the child bubble. Links can represent other effects, such as a link that causes the parent bubble to inherit the child's limits or constraints on the criteria or criteria values.

The criterion information for a criterion can include more than three types of values, corresponding to different choices of axes that the system can plot in the 3D visualization. The criteria and technology similarly can be associated with more than three types of information values. Accordingly, the system can choose from among multiple different type of information, or dimensions of information, to plot in the 3D visualization. For example, the system can generate multiple different 3D visualizations for the same technology, by visualizing the technology using different criterion information to serve as a given set of axes for a given 3D visualization.

The system can include technologies, criteria, or criteria information that do not pertain to all possible selections of axes. The system can prompt the user to choose a different set of criteria information to use as the axes, to successfully generate the 3D visualization for a given technology, criteria, or criteria information that the user would like to plot on the 3D visualization. The system reveals different values for the criterion by choosing different dimensions of information to use as the axes in the visualizations.

In an embodiment, the system can visualize five dimensions by assigning 3 to the axes, 1 dimension to bubble size, and 1 dimension to bubble color. The system can visualize additional dimensions of information using the connectors between bubbles, e.g., a dimension of interrelationship or dependency between bubbles.

The system can animate the 3D visualization, by updating the criteria information to reflect changes in the criteria information. The system can track the changes and visualize corresponding repositioning of the technologies, criteria, or criteria information when the system plots them onto the axes of the 3D visualization. The system can automatically update the criteria based on retrieving updated criteria information from the database. The system can manually update the criteria based on updated criteria information provided by the user. The system can animate the 3D visualization according to criteria information expressed as a function of another variable that changes, such as a function of time.

Figure 2:
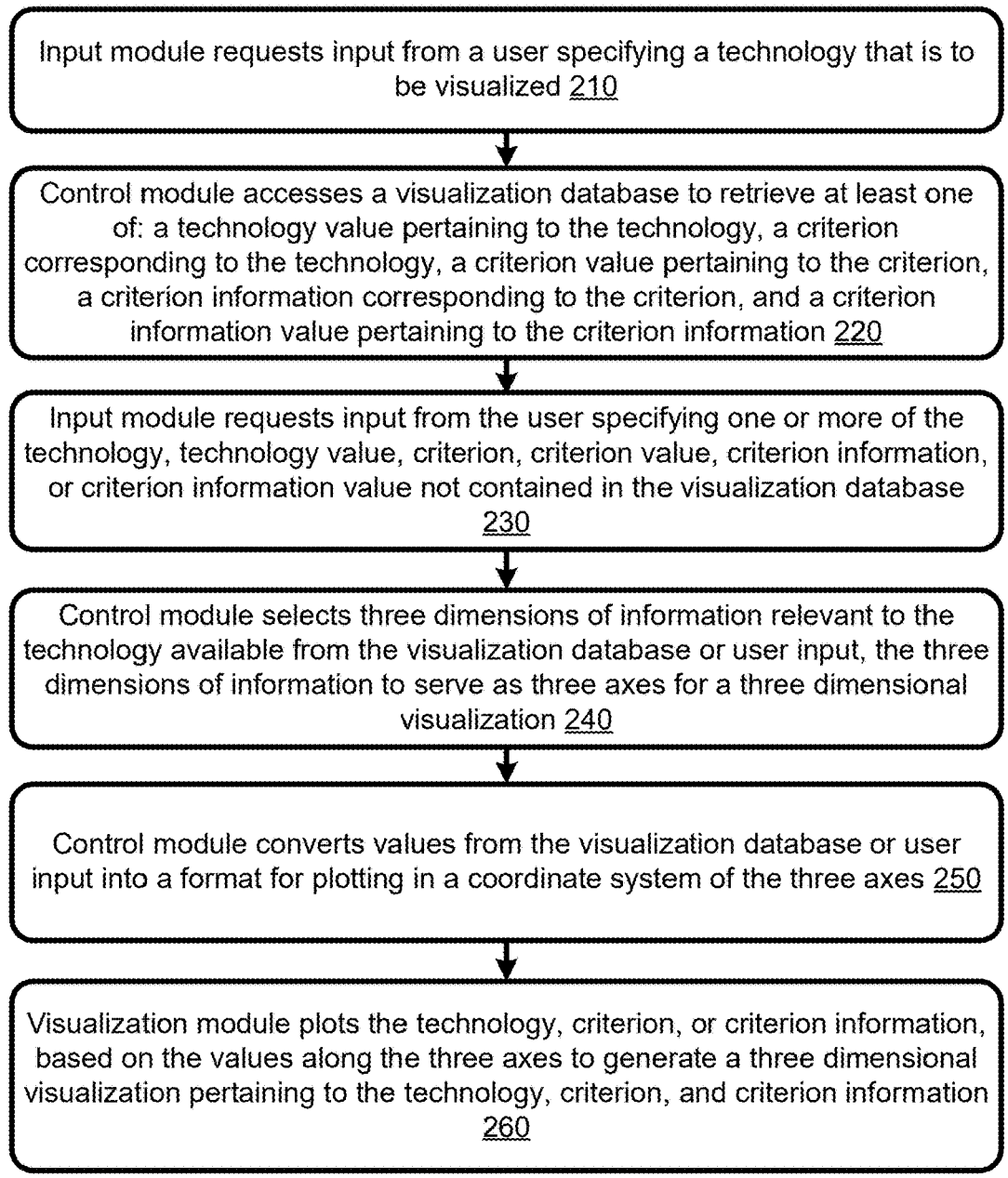
FIG. 2 illustrates a flowchart to generate a three dimensional visualization according to an embodiment.

FIG. 2 illustrates a flowchart 200 to generate a three dimensional visualization according to an embodiment. At 210, the input module requests input from a user specifying a technology that is to be visualized. For example, the computer system presents the user with a user interface to prompt for a technology to be visualized. At 220, the control module accesses a visualization database to retrieve at least one of: a technology value pertaining to the technology, a criterion corresponding to the technology, a criterion value pertaining to the criterion, a criterion information corresponding to the criterion, and a criterion information value pertaining to the criterion information. The control module determines whether such values are available in the database for the given technology. At 230, the input module requests input from the user specifying one or more of the technology, technology value, criterion, criterion value, criterion information, or criterion information value not contained in the visualization database. At 240, the control module selects three dimensions of information relevant to the technology available from the visualization database or user input, the three dimensions of information to serve as three axes for a three dimensional visualization. At 250, the control module converts values from the visualization database or user input into a format for plotting in a coordinate system of the three axes. At 260, the visualization module plots the technology, criterion, or criterion information, based on the values along the three axes to generate a three dimensional visualization pertaining to the technology, criterion, and criterion information.

The following are example scenarios that can be visualized. A scenario can be based on three parts: recommended inputs, evaluation framework, [private industry] evaluation models. Inputs—from sources such as data sources and experts, including: Impact of technology; Technical feasibility; and Potential market demand. Evaluation Framework, including: Technology development; Vulnerabilities; and Convergence potential. Evaluation models, including Competitive Lifecycle Analysis (CLA)—private industry tool to evaluate product lifecycle, product moves through circular path of different stages; and Policy Impact Matrix—2×2 potentials to evaluate best course of action for the technology of what action/policy is warranted.

An example framework can include: Framework—goal (how to visualize a technology). Present the Technology in a center circle. Present the Criteria in outer circles—represent how technology may be evaluated for potential impact. Speed-criterion, with sub-criteria (criteria information) including: Arrived—Ubiquitous; Arrived—Limited Use; 1-2 years away; 3-5 years away; More than 5 years away. Advanced Materials—Criterion, with sub-criteria (criteria information) including: Requires advanced materials for mass production that have not been developed or for which no manufacturing capacity exists; Requires advanced materials for mass production that can be produced on a limited basis at a significant cost; Requires advanced materials for mass production that are being produced on a large industrial scale; and Does not require advanced materials for mass production. Convergence—Criterion, with sub-criteria (criteria information) including: Requires another foundational technology to function; May be paired with one or more foundational technologies but is capable of functioning without; and Foundational technology. Cyber Vulnerability—Criterion, with sub-criteria (criteria information) including: Requires significant connection to the Internet or other networked devices to perform its core functions; Has connections to the Internet or other networked devices but the connection is not required to perform core functions; Connects to the Internet or other networked devices for maintenance or software upgrades only; and Does not connect to the Internet or other networked devices. Supply Chain Vulnerability—Criterion, with sub-criteria (criteria information) including: Has a complex and multi-national supply chain that includes countries possibly hostile toward US interests; Has a complex and multi-national supply chain that does not include countries possibly hostile toward US interests; Has a limited multi-national supply chain that depends upon supply from countries possibly hostile toward US interests; Has a limited multi-national supply chain that depends upon supply from countries not likely to be hostile toward US interests; Has a complex domestic supply chain; and Has a limited domestic supply chain.

Figure 3:
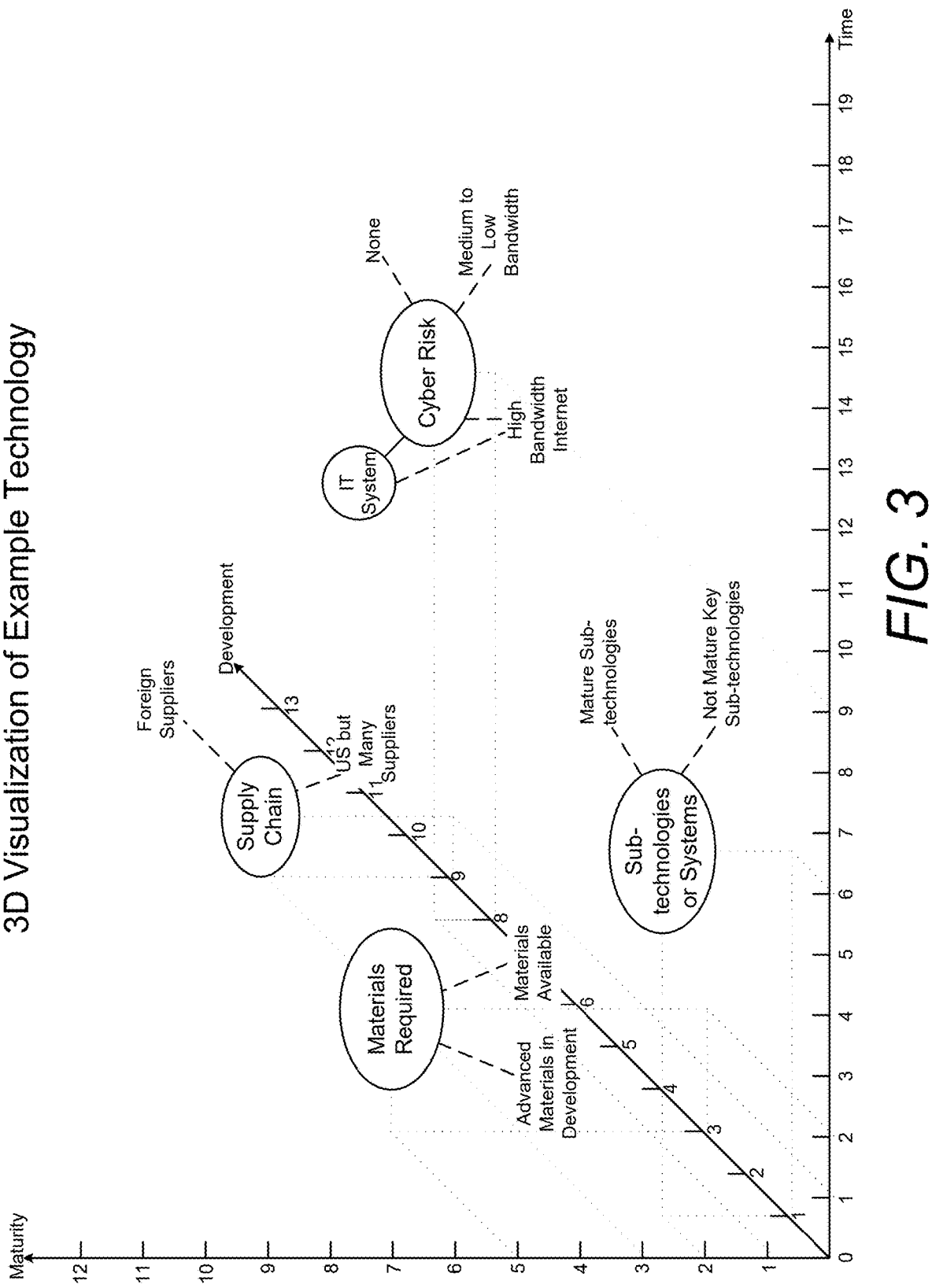
FIG. 3 illustrates a visualization of criteria and criteria information according to an embodiment.

FIG. 3 illustrates a visualization of criteria and criteria information according to an embodiment. The visualization is a 3D visualization suitable for plotting multiple different technologies together. Example walk-through of system actions to generate technology visualization—refer to FIG. 3.

Request user to specify technology: cell phone model ABC

Search database for technologies. Technology cell phone model ABC not found.

Request criteria: user specifies the criteria as being: supply chain; IT system; cyber risk; sub-technologies or systems; materials required Search database for these criteria. Criteria not found.

Request criteria information for supply chain: foreign suppliers; US but many suppliers; time=−2; maturity=2; development=9

Search database for criteria information of supply chain criteria to determine offset values: foreign suppliers=+2 time, +2 maturity; US but many suppliers=+1 time, −1 maturity. Determine total offset of +3 time, +1 maturity. Adjust supply chain position by total offset of criteria information, and plot supply chain at time=1; maturity=3, and development=9.

Request criteria information for IT system: link to cyber risk; high bandwidth internet; −2 time; −1 maturity.

Determine IT system lacks all three coordinates. Use link to cyber risk to inherit coordinate values from cyber risk, and apply offsets to inherited values (including offset from high bandwidth internet as explained below with respect to cyber risk).

Request criteria information for cyber risk: link to IT system; high bandwidth internet; medium to low bandwidth; none; time=5; maturity=3; development=8

Search database for criteria information of cyber risk criteria to determine offset values: none=+2 time, +1 maturity; medium to low bandwidth=+2 time, −1 maturity; high bandwidth internet=−2 maturity. Determine total offset of +4 time, −2 maturity. Adjust cyber risk position by total offset of criteria information, and plot cyber risk at time=9; maturity=1; development=8.

Request criteria information for sub-technologies or systems: mature sub-technologies; not mature key sub-technologies; time=2, maturity=2, development=1

Search database for criteria information of sub-technologies or systems criteria to determine offset values: mature sub-technologies=+2 time, +1 maturity; not mature key sub-technologies=+2 time, −1 maturity. Determine total offset of +4 time. Adjust sub-technologies or systems position by total offset of criteria information, and plot sub-technologies or systems at time=6, maturity=2, development=1.

Request criteria information for materials required: advanced materials in development; materials available; time=2; maturity=9; development=3

Search database for criteria information of materials required to determine offset values: advanced materials in development=−1 time, −2 maturity; materials available=+1 time, −2 maturity. Determine total offset of −4 maturity. Adjust materials required position by total offset of criteria information, and plot materials required at time=2; maturity=5; development 3.

Figure 4:
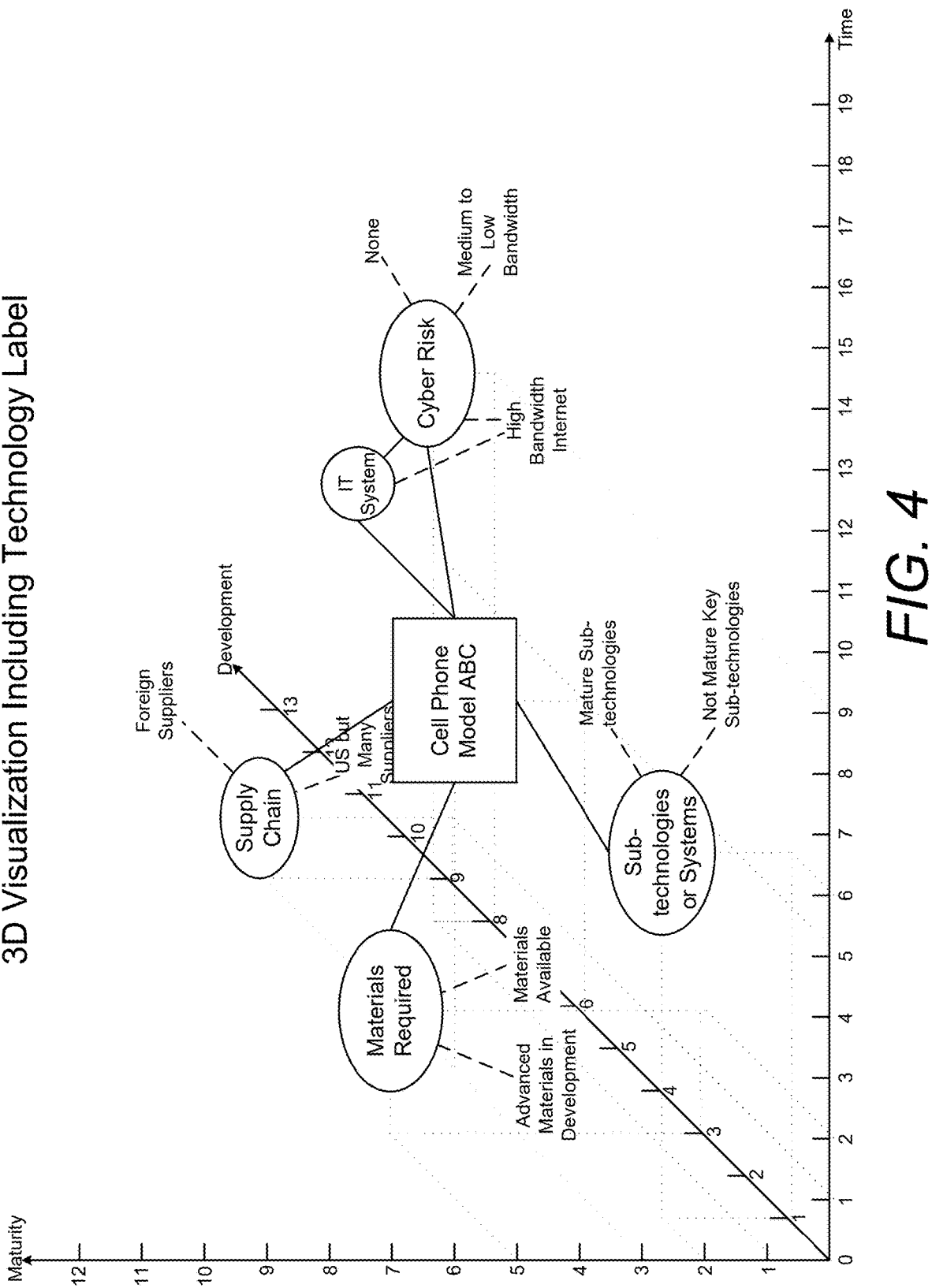
FIG. 4 illustrates a visualization of criteria and criteria information according to an embodiment.

Request dimensions of criteria information to use as axes: x-axis=time, y-axis=maturity, z-axis=development FIG. 4 illustrates a visualization of criteria and criteria information according to an embodiment. The visualization is a 3D visualization suitable for plotting multiple different technologies together. The 3D visualization includes a label for the technology linked to its criteria. When multiple technologies are plotted together, the 3D visualization provides a visual indication for where each technology lies relative to the other technologies. The system determines the coordinates for the technology label by determining the averages of each dimension for the various criteria for that technology. In the illustrated example, the criteria coordinates are given in the format (time, maturity, development) as: supply chain (1,3, 9), IT system (8,4,8), cyber risk (9,1,8), sub-technologies or systems (6,2,1), materials required (2,5,3). The averages of the dimensions for these criteria are (5.2,3,5.8), which are assigned as the coordinates for the technology label for these criteria, illustrated with a rectangular bubble.

Figure 5:
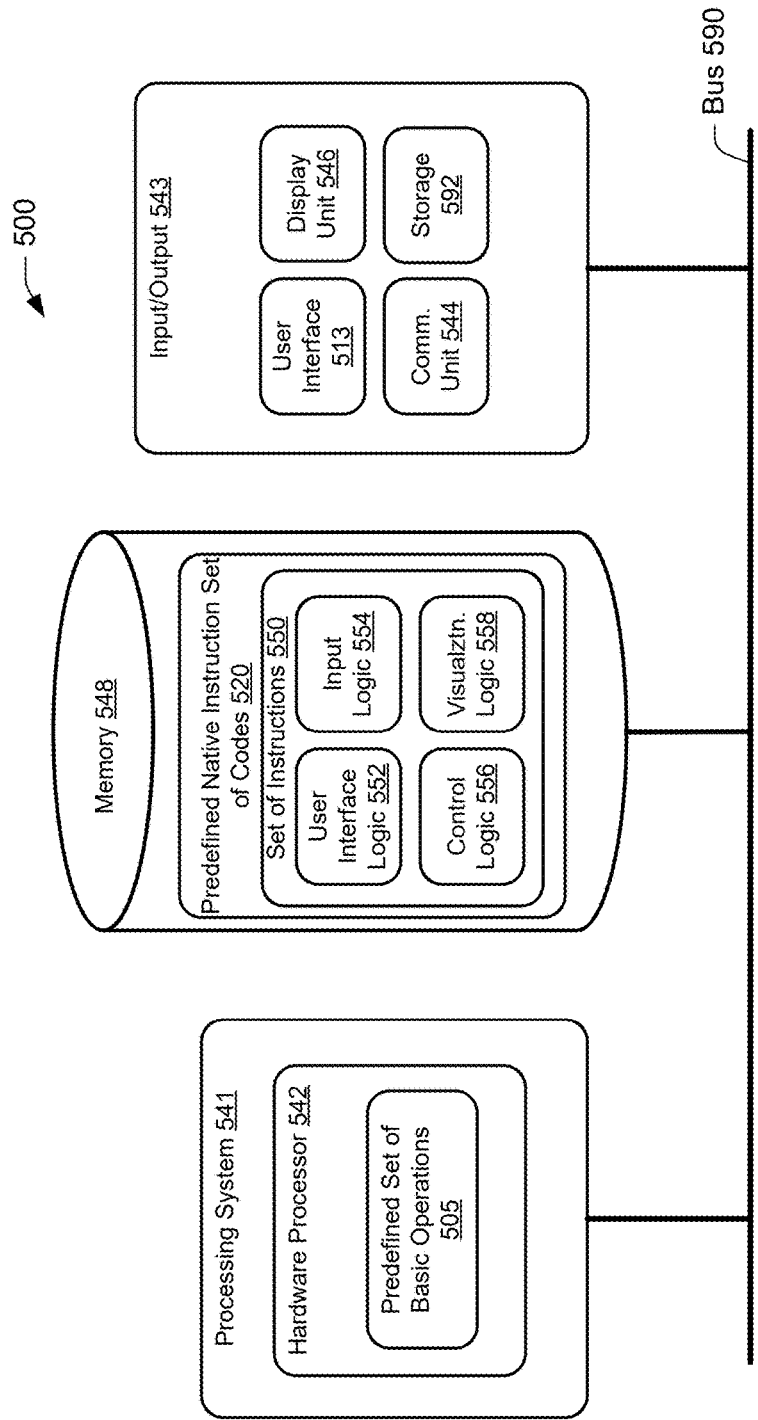
FIG. 5 illustrates a diagram of a computer system according to an embodiment.

FIG. 5 illustrates a diagram of a computer system 500 according to an embodiment. The computer system 500 includes a processing system 541, memory 548, and input/output module 543 communicatively coupled via bus 590. The processing system 541 includes hardware processor 542. The hardware processor 542 includes predefined set of basic operations 505. The memory 548 includes predefined native instruction set of codes 520. The predefined native instruction set of codes 520 includes a set of instructions 550. The set of instructions 550 includes user interface logic 552, input logic 554, control logic 556, and visualization logic 558. The input/output 543 includes user interface 513, display unit 546, communication unit 544, and storage 592. In an embodiment, such components may serve as the computer system including the logic that carries out the methods described herein.

Figure 6:
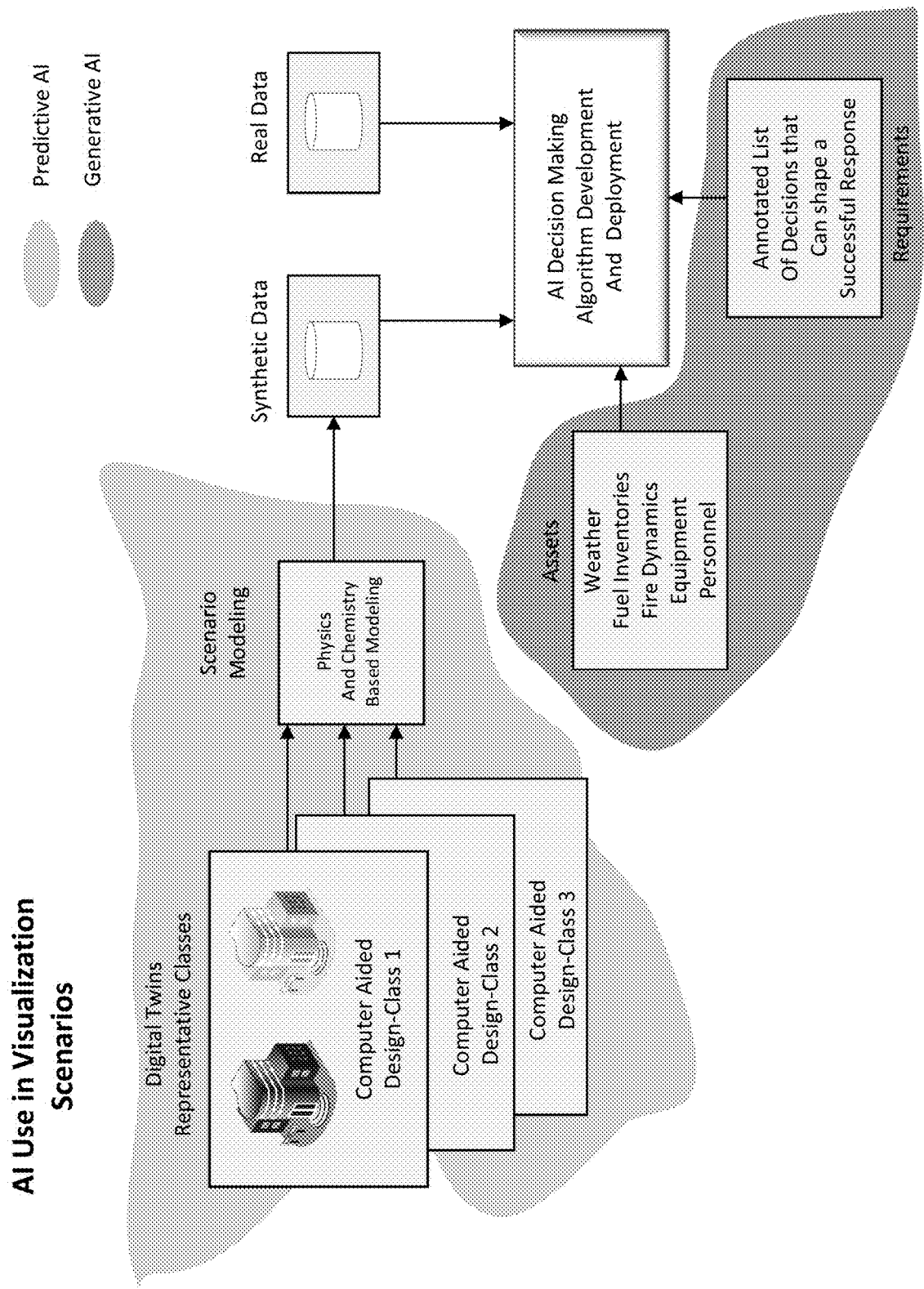
FIG. 6 illustrates a scenario diagram according to an embodiment.

FIG. 6 illustrates a scenario diagram according to an embodiment. Implementation of database—the database can serve as a back-end for the system to access information. The back-end or database can store entries for technologies, criteria, and criteria information. A given entry in the database includes an identifier such as a name, and various fields, such as criteria (for a technology entry to link to its criteria), criteria information (for a criteria to link to its criteria information), values or scores, links, and so on. A given entry can include an unlimited number of fields. A given entry can include fields corresponding to the values for one or more dimensions of coordinates for plotting in the 3D visualization. The given entry can include dimensions that are used in certain types of 3D visualizations, depending on whether the dimension is relevant to a given axis used in that 3D visualization. The given entry can include dimensions that are not intended to be plotted on the 3D visualization, such as information that happens to be available for that entry. The given entry can also include information stored for the benefit of the user, information to interconnect entries together, or other information that is not necessarily used for generating coordinates for plotting on a 3D visualization.

The system can present a front-end user interface, to allow users to provide information. In an embodiment, the system presents the user with a selection of different technologies, criteria, or criteria information using a drop down field, which informs the user what options are available in the database which the system uses to populate the drop down selector, while allowing the user to select one of the options in the drop down.

The system can use AI models to determine values for criteria information or other information for a given entry in the database. The system also can use AI models to obtain information about a technology, and determine how to fit that information into a given technology, criteria, or criteria information.

The system can use AI models that are trained by technology, criteria, and criteria information that users have already added to the database. Accordingly, when subsequent users access the database, the system uses an AI model to receive the user input, and infer corresponding values. For example, the AI model can be trained to have certain values for a certain technology. The user accesses the database and specifies a given technology, criteria, and criteria information not contained in the database. The AI model determines a closest match to technologies, criteria, and criteria information contained in the database, and interpolates the available criteria information to determine interpolated criteria information. The system then populates the database with the interpolated information for the given technology and criteria. Accordingly, the system can then select criteria information and other values from the database that the system uses the plot in a 3D visualization the new given technology submitted by the user. The system can infer the maturity, speed, availability, market conditions, and other factors for criteria information of newly presented technologies that a user wishes to visualize.

The bubbles presented in the 3D visualization correspond to technologies, criteria, and criteria information. The system can generate each bubble using a smart system, such as a neuron-based system based on history and expectations of other similar technologies, criteria, and criteria information. For example, the smart neuron-based system can infer criteria information such as from where and for how long of a time period it might take to progress a given technology to a given point. The system can analyze and model a given technology (e.g., 5G cellular communications technology), and update the model each year on a year-by-year basis by analyzing the results contained in the database. The system can use a trained algorithm to analyze the database for different technologies, criteria, and criteria information. The system can populate and update 3D visualizations for various technologies in this manner, to provide updates for a given field or broader view of a collection of technologies, criteria, or criteria information.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined or rearranged with other portions of this disclosure and the knowledge of one of ordinary skill in the art. It is the intention of this disclosure to encompass and include such variation. To the extent any elements or steps are described as "optional," it does not indicate that all or any other elements or steps are mandatory.

What is claimed is:

1. A method of technology visualization, comprising:
requesting, by an input module, input from a user specifying a technology that is to be visualized, using a front-end user interface containing drop down fields, to inform the user what selectable options are available in a visualization database that populate a drop down selector for the drop down field;
accessing, by a control module, the visualization database to retrieve from the visualization database, for the technology that is to be visualized, at least one of: a technology value pertaining to the technology, a criterion corresponding to the technology, a criterion value pertaining to the criterion, a criterion information corresponding to the criterion, and a criterion information value pertaining to the criterion information, wherein the technology value, criterion value, and criterion information value are values having a plurality of dimensions, respectively;
determining, by the control module, three most common dimensions found among the technology values, criterion values, and criterion information values pertaining to the technology specified by the user for visualization;
selecting, by the control module, the three most common dimensions of information relevant to the technology available from the visualization database or user input, the three most common dimensions of information to serve as three axes for a three dimensional visualization;
inheriting, for criterion information that lacks values for the three most common dimensions to be plotted, values for missing dimensions from the technology or other criteria or criterion information for the technology to which the criterion information is assigned;
converting, by the control module, values from the visualization database or user input into a format for plotting in a coordinate system of the three axes;
plotting, by a visualization module, the technology, criterion, or criterion information, based on the values along the three axes to generate and output a three dimensional visualization pertaining to the technology, criterion, and criterion information;
plotting, by the visualization module, the technology by determining an average score for values of each dimension for the criterion information or criterion available for the technology, and assigning the average score for those values for each dimension to the technology as its coordinates in those dimensions;
identifying, by the control module, different criterion information to serve as an alternative set of axes for a 3D visualization; and
plotting, by the visualization module, at least one of the technology, criterion, or criterion information, based on different values along the alternative set of axes to generate and output a different 3D visualization pertaining to the technology, to reveal different values for the criterion by having chosen alternative dimensions of information to use as the axes in the visualization.

2. The method of claim 1, further comprising:
receiving a user query for a technology, technology value, criterion, criterion value, criterion information, or criterion information value that is not plotted on the three dimensional visualization;
generating values including synthetic technology values, synthetic criterion values, and synthetic criterion information values for the user query; and
plotting the synthetic values corresponding to the user query onto the three dimensional visualization, based on the synthetic values.

3. The method of claim 1, further comprising:
prompting for user input indicating a type of axis desired to be included in the three dimensional visualization;
identifying values corresponding to the type of axis; and
converting the values corresponding to the type of axis into a format suitable for plotting along the type of axis.

4. The method of claim 3, wherein the type of axis is speed, the values corresponding to the type of axis are values for time, and the format suitable for plotting is applying a function to calculate an inverse of the time values to generate speed values suitable for plotting on the axis for speed.

5. The method of claim 1, further comprising:
identifying a criterion information that is missing at least one criterion information value; and
assigning the at least one criterion information value by inheriting and interpolating the criterion value from the criterion associated with the criterion information.

6. The method of claim 1, further comprising:
identifying a criterion that is missing at least one criterion value; and
assigning the at least one criterion value by inheriting and interpolating the technology value from the technology associated with the criterion.

7. The method of claim 1, further comprising:
identifying a criterion information that is missing at least one criterion information value;
determining a parent criterion from which the identified criterion information depends;
determining other child criterion information that depend from the parent criterion;
determining an average child criterion information value by calculating an average of a plurality of criterion information values from the other child criterion information of the parent criterion; and
assigning the average child criterion information value to the missing at least one criterion information value.

8. The method of claim 1, further comprising:
identifying a criterion information that is missing at least one criterion information value;
determining a parent criterion from which the criterion information depends;
determining a related criterion information that depends from the parent criterion and demonstrates a functional relationship between the criterion information and the related criterion information; and
calculating the at least one criterion information value that is missing by applying a function, representing the functional relationship, to the criterion information values of the related criterion information.

9. The method of claim 8, wherein the criterion information is speed(s), the related criterion information is time (t), the functional relationship is an inverse relationship, and the function is s=1/t.

10. The method of claim 1, wherein the visualization database includes a value mapping between descriptive names for criteria information and corresponding criteria information values.

11. The method of claim 10, wherein the value mapping is a lookup table of value offsets corresponding to different descriptive names for criteria information, the value offsets being applied to coordinates of a parent criteria having a criteria information with a descriptive name found in the lookup table.

12. The method of claim 1, further comprising converting the values into a format for plotting by normalizing a value scale of the values to cover a displayed range of a given axis in the three dimensional visualization.

13. The method of claim 1, further comprising:
plotting a criterion connector visually connecting the technology to its corresponding criterion; and
plotting a criterion information connector visually connecting the criterion to its corresponding criterion information.

14. The method of claim 1, further comprising assigning technology values, for plotting the technology, as an average of the criterion values from criteria pertaining to the technology.

15. The method of claim 1, further comprising:
determining that the technology is associated with the technology value, the criterion value, and the criterion information value having more than three dimensions;
indicating to the user which additional dimensions are available;
responsive to user selection, generating the alternative axes using different one of the available dimensions; and
plotting the technology, criterion, or criterion information along the alternative axes.

16. The method of claim 1, further comprising storing, in the visualization database, input from the user to add an entry for a technology, the entry having fields including a technology name identifier, the technology value, the criterion, the criterion value, the criterion information, and the criterion information value, wherein a given field corresponds to a plurality of dimensions.

17. A system to visualize a technology, comprising:
a computer system, including:
a processing system having a hardware processor configured to perform a predefined set of basic operations by loading corresponding ones of a predefined native instruction set of codes, the predefined native instruction set of codes constituting a set of instructions selectable for execution by the hardware processor;
a memory accessible to the processing system; and
a user interface controller under control of the processing system;
user interface logic, stored in the memory, comprising a sequence of instructions selected from the predefined native instruction set of codes of the hardware processor, adapted to operate with the processing system and the user interface controller to implement a user interface adapted to prompt for user input and receive the user input;
a communication system, under control of the processing system, adapted to:
transmit and receive user input, values, axes, and information pertaining to the technology for a three dimensional visualization;
input logic, stored in the memory, comprising a respective sequence of instructions selected from the predefined native instruction set of codes of the hardware processor, adapted to request input from a user specifying a technology that is to be visualized, using a front-end user interface containing drop down fields, to inform the user what selectable options are available in a visualization database that populate a drop down selector for the drop down field;
control logic, stored in the memory, comprising a respective sequence of instructions selected from the predefined native instruction set of codes of the hardware processor, adapted to access the visualization database to retrieve from the visualization database, for the technology that is to be visualized, at least one of: a technology value pertaining to the technology, a criterion corresponding to the technology, a criterion value pertaining to the criterion, a criterion information corresponding to the criterion, and a criterion information value pertaining to the criterion information, wherein the technology value, criterion value, and criterion information value are values having a plurality of dimensions, respectively;
the control logic being further adapted to determine three most common dimensions found among the technology values, criterion values, and criterion information values pertaining to the technology specified by the user for visualization;
the control logic being further adapted to select the three most common dimensions of information relevant to the technology available from the visualization database or user input, the three most common dimensions of information to serve as three axes for a three dimensional visualization;
the control logic being further adapted to inherit, for criterion information that lacks values for the three most common dimensions to be plotted, values for missing dimensions from the technology or other criteria or criterion information for the technology to which the criterion information is assigned;
the control logic being further adapted to convert values from the visualization database or user input into a format for plotting in a coordinate system of the three axes;
visualization logic, stored in the memory, comprising a respective sequence of instructions selected from the predefined native instruction set of codes of the hardware processor, adapted to plot of the technology, criterion, or criterion information, based on the values along the three axes to generate and output a three dimensional visualization pertaining to the technology, criterion, and criterion information;
the processing system being further configured to output the three dimensional visualization
the visualization logic being further adapted to plot the technology by determining an average score for values of each dimension for the criterion information or criterion available for the technology, and assigning the average score for those values for each dimension to the technology as its coordinates in those dimensions;
the control logic being further adapted to identify different criterion information to serve as an alternative set of axes for a 3D visualization; and the visualization logic being further adapted to plot at least one of the technology, criterion, or criterion information, based on different values along the alternative set of axes to generate and output a different 3D visualization pertaining to the technology, to reveal different values for the criterion by having chosen alternative dimensions of information to use as the axes in the visualization.

18. A tangible non-transitory computer-readable medium having stored thereon computer-executable instructions that, if executed by a computing device, cause the computing device to:
  request, by an input module, input from a user specifying a technology that is to be visualized, using a front-end user interface containing drop down fields, to inform the user what selectable options are available in a visualization database that populate a drop down selector for the drop down field;
  access, by a control module, the visualization database to retrieve from the visualization database, for the technology that is to be visualized, at least one of: a technology value pertaining to the technology, a criterion corresponding to the technology, a criterion value pertaining to the criterion, a criterion information corresponding to the criterion, and a criterion information value pertaining to the criterion information, wherein the technology value, criterion value, and criterion information value are values having a plurality of dimensions, respectively;
  determine, by the control module, three most common dimensions found among the technology values, criterion values, and criterion information values pertaining to the technology specified by the user for visualization;
  select, by the control module, the three most common dimensions of information relevant to the technology available from the visualization database or user input, the three most common dimensions of information to serve as three axes for a three dimensional visualization;
  inherit, for criterion information that lacks values for the three most common dimensions to be plotted, values for missing dimensions from the technology or other criteria or criterion information for the technology to which the criterion information is assigned;
  convert, by the control module, values from the visualization database or user input into a format for plotting in a coordinate system of the three axes;
  plot, by a visualization module, the technology, criterion, or criterion information, based on the values along the three axes to generate and output a three dimensional visualization pertaining to the technology, criterion, and criterion information;
  plot, by the visualization module, the technology by determining an average score for values of each dimension for the criterion information or criterion available for the technology, and assigning the average score for those values for each dimension to the technology as its coordinates in those dimensions;
  identify, by the control module, different criterion information to serve as an alternative set of axes for a 3D visualization; and
  plot, by the visualization module, at least one of the technology, criterion, or criterion information, based on different values along the alternative set of axes to generate and output a different 3D visualization pertaining to the technology, to reveal different values for the criterion by having chosen alternative dimensions of information to use as the axes in the visualization.

19. The computer readable medium of claim 18, further comprising instructions that, if executed, cause the computing device to:
  prompt for user input indicating a type of axis desired to be included in the three dimensional visualization;
  identify values corresponding to the type of axis; and
  convert the values corresponding to the type of axis into a format suitable for plotting along the type of axis.

20. The computer readable medium of claim 18, further comprising instructions that, if executed, cause the computing device to:
  identify a criterion information that is missing at least one criterion information value; and
  assign the at least one criterion information value by inheriting and interpolating the criterion value from the criterion associated with the criterion information.

21. The computer readable medium of claim 18, further comprising instructions that, if executed, cause the computing device to:
  identify a criterion that is missing at least one criterion value; and
  assign the at least one criterion value by inheriting and interpolating the technology value from the technology associated with the criterion.

22. The computer readable medium of claim 18, further comprising instructions that, if executed, cause the computing device to:
  identify a criterion information that is missing at least one criterion information value;
  determine a parent criterion from which the identified criterion information depends;
  determine other child criterion information that depend from the parent criterion;
  determine an average child criterion information value by calculating an average of a plurality of criterion information values from the other child criterion information of the parent criterion; and
  assign the average child criterion information value to the missing at least one criterion information value.

23. The computer readable medium of claim 18, wherein the visualization database includes a value mapping between descriptive names for criteria information and corresponding criteria information values, the value mapping being a lookup table of value offsets corresponding to different descriptive names for criteria information, the value offsets being applied to coordinates of a parent criteria having a criteria information with a descriptive name found in the lookup table.

24. The computer readable medium of claim 18, further comprising instructions that, if executed, cause the computing device to plot a criterion connector visually connecting the technology to its corresponding criterion; and plot a criterion information connector visually connecting the criterion to its corresponding criterion information.

25. The computer readable medium of claim 18, further comprising instructions that, if executed, cause the computing device to assign technology values, for plotting the technology, as an average of the criterion values from criteria pertaining to the technology.

26. The computer readable medium of claim 18, further comprising instructions that, if executed, cause the computing device to:
  determine that the technology is associated with the technology value, the criterion value, and the criterion information value having more than three dimensions;

indicate to the user which additional dimensions are available;

responsive to user selection, generate the alternative axes using different one of the available dimensions; and plot the technology, criterion, or criterion information along the alternative axes.

27. The computer readable medium of claim 18, further comprising instructions that, if executed, cause the computing device to store, in the visualization database, input from the user to add an entry for a technology, the entry having fields including a technology name identifier, the technology value, the criterion, the criterion value, the criterion information, and the criterion information value, wherein a given field corresponds to a plurality of dimensions.

* * * * *